March 19, 1929.  C. V. HALLENBECK  1,706,289
TAIL GATE STRUCTURE
Filed Feb. 25, 1928  2 Sheets-Sheet 1
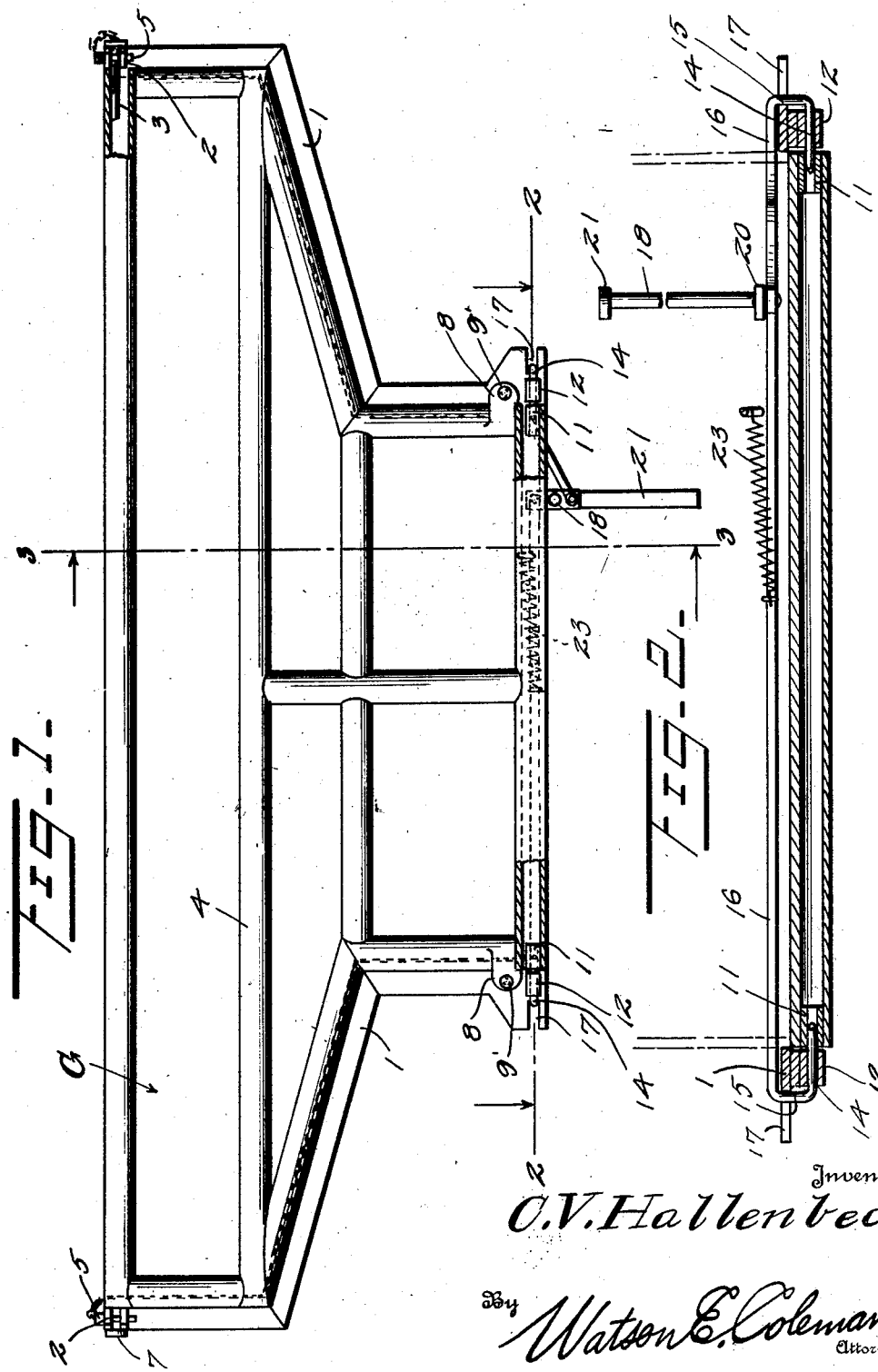
Inventor
C. V. Hallenbeck
By Watson E. Coleman
Attorney

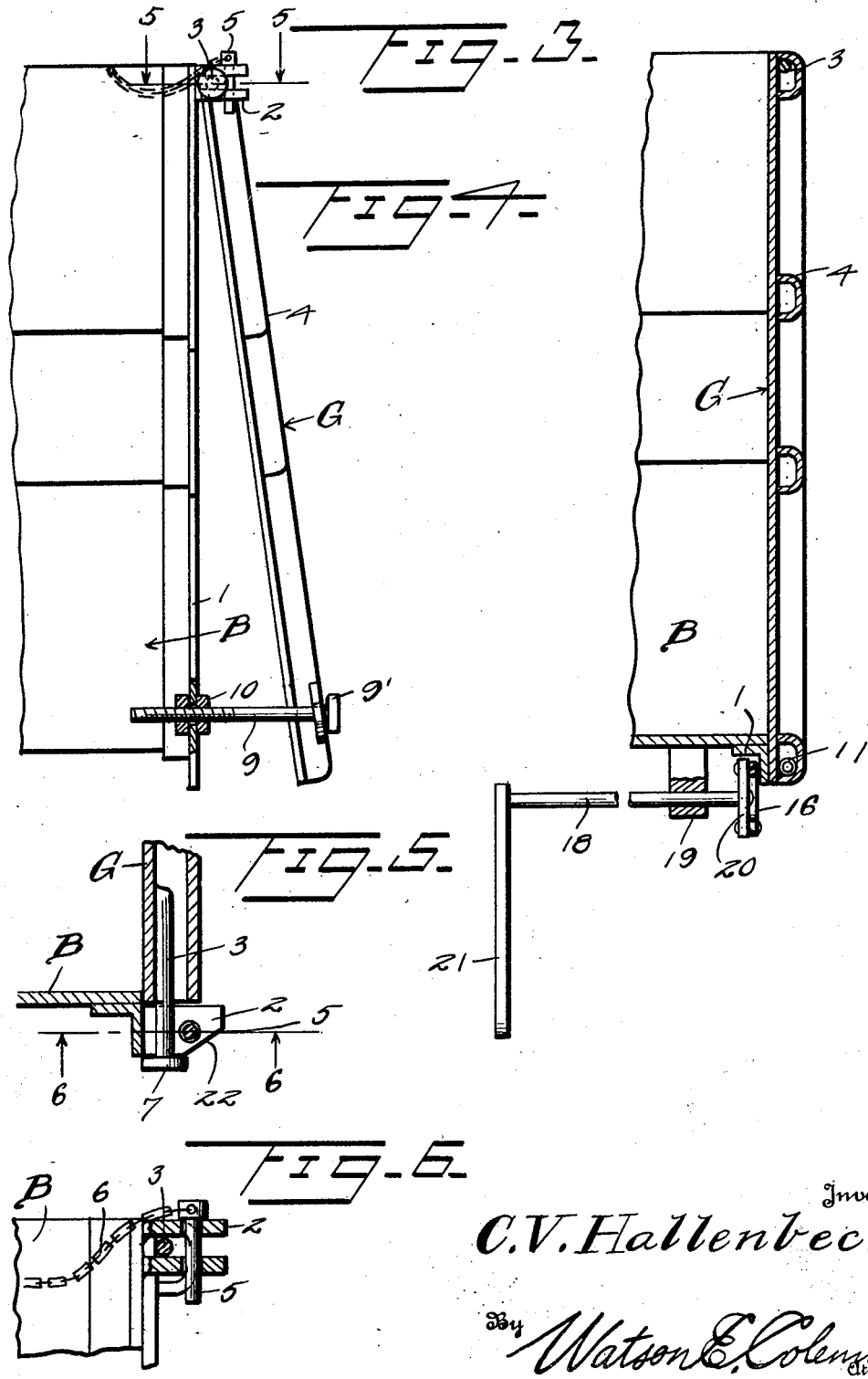

Patented Mar. 19, 1929.

1,706,289

UNITED STATES PATENT OFFICE.

CHARLES V. HALLENBECK, OF RIFLE, COLORADO.

TAIL-GATE STRUCTURE.

Application filed February 25, 1928. Serial No. 256,939.

This invention relates to tail gate structures and it is an object of the invention to provide means whereby the gate proper may be swung either upwardly or downwardly into open position in accordance with the character of the load or the preference of practice, together with means whereby the gate is effectively held or locked in closed position.

It is also an object of the invention to provide a tail gate and a mounting therefor wherein the mounting is constructed in a manner to take up any tendency of outward spread of the side walls of the wagon body when the gate is moved into closed position, said mounting when the gate is closed also serving to prevent spreading of the wagon body especially when the side walls are subjected to excessive strain.

Another object of the invention is to provide fastening means for maintaining the tail gate in closed position, said means being carried by the wagon body and engageable with the gate when closed, together with means arranged to one side of the body for operating the fastening means and more especially to adjust the same into release position.

An additional object of the invention is to provide a tail gate having associated therewith means for limiting the extent of the opening movement of the tail gate under the influence of the load being discharged, thereby enabling effective control of such load discharged which is of particular advantage when desired to spread the load, such as sand, gravel and the like, over a given surface.

The invention consists in the details of construction and in the combination and arrangement of the several parts of my improved tail gate structure whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in rear elevation illustrating an end gate structure constructed in accordance with an embodiment of my invention, the gate proper being in closed position and portions being broken away;

Figure 2 is a sectional view taken substantially on the line 2—2 of Figure 1, portions of the vehicle body proper being diagrammatically indicated by broken lines;

Figure 3 is a sectional view taken substantially on the line 3—3 of Figure 1;

Figure 4 is a view partly in side elevation and partly in section of the structure as herein disclosed, the gate proper being shown in a partly open position;

Figure 5 is an enlarged detailed sectional view taken substantially on the line 5—5 of Figure 4;

Figure 6 is a detailed sectional view taken substantially on the line 6—6 of Figure 3.

As disclosed in the accompanying drawings, B denotes a vehicle body, herein disclosed of a type similar to that particularly described and illustrated in an application for patent executed on even date herewith, and wherein the rear end marginal portions of the body B are defined by the flanges 1 outwardly disposed with respect to the body B. The upper end portions of the side flanges 1 immediately adjacent the tops thereof are provided with the rearwardly disposed and vertically spaced ears 2 between which are adapted to be freely engaged the extended pivot lugs 3 carried by the upper corners of the tail gate G. This gate G is preferably constructed of sheet metal and has welded or otherwise disposed if desired over its outer face the strengthening members 4 preferably of a channel formation. The pivot lugs 3 are welded to the gate G at points within a member 4.

After the lugs 3 have been properly engaged between the ears 2, said lugs are maintained against displacement by the retaining pins 5 preferably disposed from above through the ears 2 and bridging the spaces therebetween. In order to prevent loss, each of the pins 5 is connected by a chain 6 or otherwise to the body B. The outer extremities of the lugs 3 are provided with the heads 7 which are adapted to have substantially close contact with the outer margins of the ears 2 at their inner portions whereby is effectively prevented spreading of the body B, especially when the sides of said body are subjected to excessive strains.

The gate G is of such dimensions to partially overlie or lap the flanges 1 when the gate is in its closed position and said gate at its lower corners is provided with the outstanding and laterally directed ears 8 through each of which is freely directed from without a headed shank 9. This shank 9 is also freely disposed through an adjacent portion of a flange 1 and engaging opposite faces of said flange 1 are locking members 10 threaded upon the shank 9.

By adjusting the shanks 9 lengthwise the limit of outward swinging movement of the gate G, with the lugs 3 as a fulcrum, will be regulated by contact of the gate G with the heads 9' of the shanks 9. By the use of the shanks 9 and the locking members 10 threaded thereon, the extent of such outward swinging movement of the gate G may be controlled to a minute degree. This is of advantage because, in practice, with the outward swinging movement of the gate being properly limited and with the body B inclined in a predetermined angle, the vehicle may be caused to advance at a speed to assure an even spreading upon a given surface of the load within the body B. This is of particular importance in road construction and in connection with the delivery of sand, gravel or kindred road materials.

One of the strengthening members 4 is disposed along the lower marginal portion of the gate G and welded within the opposite end portions of such member 4 are the barrels 11 which, when the gate is fully closed, register with the barrels 12 welded to the flanges 1. The barrels 12 provide a mounting for the slidable locking bolts 14 which, when moved inwardly, are adapted to enter the barrels 11 of the closed gate and thereby effectively hold the gate against opening movement, or to provide pivot members to permit the gate G to be swung downwardly into an open position. When this operation is desired, it is only required that the pins 5 be first removed. It is also to be understood that upon downward swinging movement of the gate G, the shanks 9 will also be removed and there are also conditions of operation wherein the shanks 9 will be omitted when the gate is supported or mounted for upward swinging movement.

Each of the bolts 14 has its outer extremity continued by an inwardly disposed arm 15 which in turn is continued by an elongated arm 16 which is substantially parallel to the bolt 14 and said arm 16 is preferably directly behind the flange 1 defining the lower or bottom edge at the tail end of the body B so that, in practice, the arm 16 is substantially entirely concealed from view and thereby is thoroughly protected. Each of the arms 15 is disposed through and moves with the bolt 14 within a slot 17 provided in an extremity of the bottom flange 1. These slots 17 are preferably open at their outer ends to facilitate the assembly of the bolts 14.

Extending lengthwise of the body B therebelow and closely adjacent to one side of the body is a rock shaft 18 supported by a suitable number of bearings 19. The rear end portion of this shaft 18 has fixed thereto for rocking movement therewith a cross head 20. To one end portion of the head 20 is operatively engaged one arm 16 and to the opposite end portion of said head 20 is operatively engaged the second arm 16 so that, upon requisite rocking movement being imparted to the shaft 18, the head 20 will move in a direction to either simultaneously move the bolts 14 inwardly into locking position, or to move the same outwardly into release position.

At a suitable point therealong the shaft 18 has operatively engaged therewith a depending operating handle or lever 21. By having the lever 21 disposed downwardly the same may be readily grasped by an operator when the body B is in lowered position but with particular advantage as the body is raised or swung upwardly to a required dumping angle.

The outer forward corner portions of the ears 2, hereinbefore referred to, are disposed inwardly on suitable bevels, as at 22, to provide cam edges with which the heads 7 of the lugs 3 will contact when the gate is swung upwardly into closed position or in that assembly when the bolts 14 serve as the pivot members for the gate. Should the sides of the body spread as a result of abnormal strain being imposed thereon, this contact of the heads 7 with the bevel or cam edges 22 as the gate G is swung into fully closed position will result in said side walls of the body B being forced inwardly or returned to their normal position. This contact also serves to prevent the gate G from having such undue lateral or transverse movement which would otherwise probably derange the pivotal mounting of the gate on the bolts 14.

The bolts 14 are constantly urged inwardly by a retractile spring 23 one end portion of which is secured to an arm 16 and the opposite end portion anchored to an adjacent flange 1.

From the foregoing description it is thought to be obvious that a tail gate structure constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with an end of a wagon body, a tail gate therefor, barrels carried by the body at opposite sides of the tail gate when closed, bolts slidably supported by said barrels and engageable with the gate when closed upon inward movement of the bolts to hold the gate against opening movement, inwardly directed arms connected with the bolts, a rock shaft supported by the body to one side thereof, a cross head carried by the shaft, the arms being operatively connected with the opposite end portions of said head to cause simultaneous inward or outward movement of the bolts upon rocking movement of the shaft.

2. In combination with an end of a wagon body, a tail gate therefor, barrels carried by the body at opposite sides of the tail gate when closed, bolts slidably supported by said barrels and engageable with the gate when closed upon inward movement of the bolts to hold the gate against opening movement, inwardly directed arms connected with the bolts, a rock shaft supported by the body to one side thereof, a cross head carried by the shaft, the arms being operatively connected with the opposite end portions of said head to cause simultaneous inward or outward movement of the bolts upon rocking movement of the shaft, and means for limiting the outward movement of the tail gate when the bolts are free therefrom.

In testimony whereof I hereunto affix my signature.

CHARLES V. HALLENBECK.